Dec. 22, 1925.  
C. E. ADAMSON  
1,566,900  
PORTABLE BAKING AND COOKING OVEN  
Filed May 22, 1925   2 Sheets-Sheet 1

Inventor  
Charles E. Adamson  
By Bryant & Lowry  
Attorneys

Dec. 22, 1925.  
C. E. ADAMSON  
1,566,900  
PORTABLE BAKING AND COOKING OVEN  
Filed May 22, 1925   2 Sheets-Sheet 2

Inventor  
Charles E. Adamson  
By Bryant & Lowry  
Attorneys

Patented Dec. 22, 1925.

1,566,900

UNITED STATES PATENT OFFICE.

CHARLES E. ADAMSON, OF WABASH, INDIANA, ASSIGNOR OF ONE-HALF TO PHILIP L. ZORBAUGH, OF FORT WAYNE, INDIANA.

PORTABLE BAKING AND COOKING OVEN.

Application filed May 22, 1925. Serial No. 32,225.

*To all whom it may concern:*

Be it known that I, CHARLES E. ADAMSON, a citizen of the United States of America, residing at Wabash, in the county of Wabash and State of Indiana, have invented certain new and useful Improvements in Portable Baking and Cooking Ovens, of which the following is a specification.

The present invention relates to improvements in portable baking and cooking ovens.

The primary object of this invention is to provide a portable oven of the type adapted to be placed on the top of a stove or burner so that the heat rising from the latter will pass directly into the interior of the oven for baking or cooking the contents of the latter.

A further object of the invention is to provide an oven of a construction to permit all kinds of cooking, baking, roasting, and toasting to be performed therewith.

A further object of the invention is to provide a novel form of removable bottom for the oven which will control the flow of direct and radiated heat through the oven.

A still further object of the invention is to provide a novel form of bottom upon which an article supporting rack may be arranged in two positions for holding the article to be cooked or baked at different elevations in the oven.

Other objects and advantages of the invention will be apparent during the course of the following description.

Figure 1:
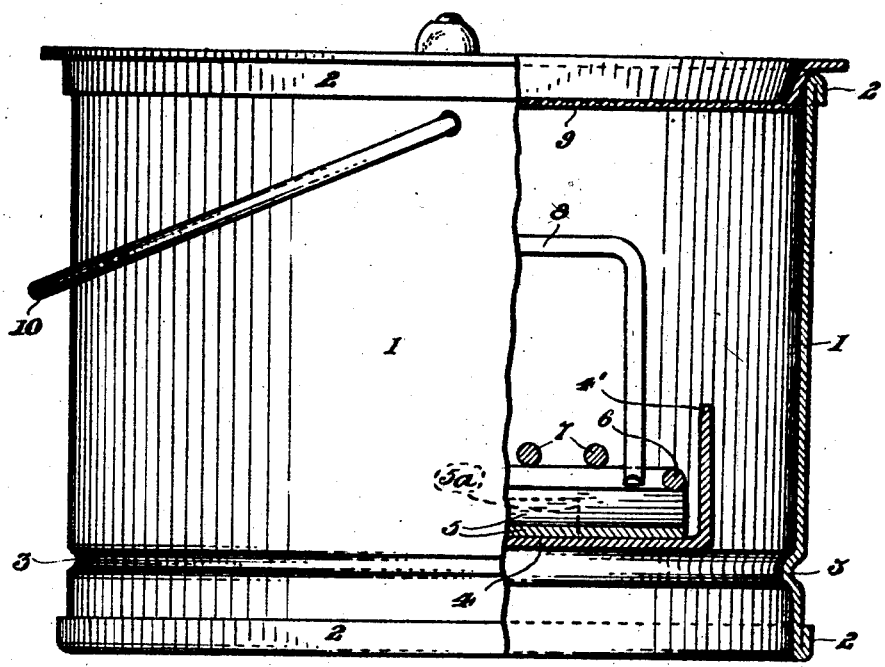
Figure 2:
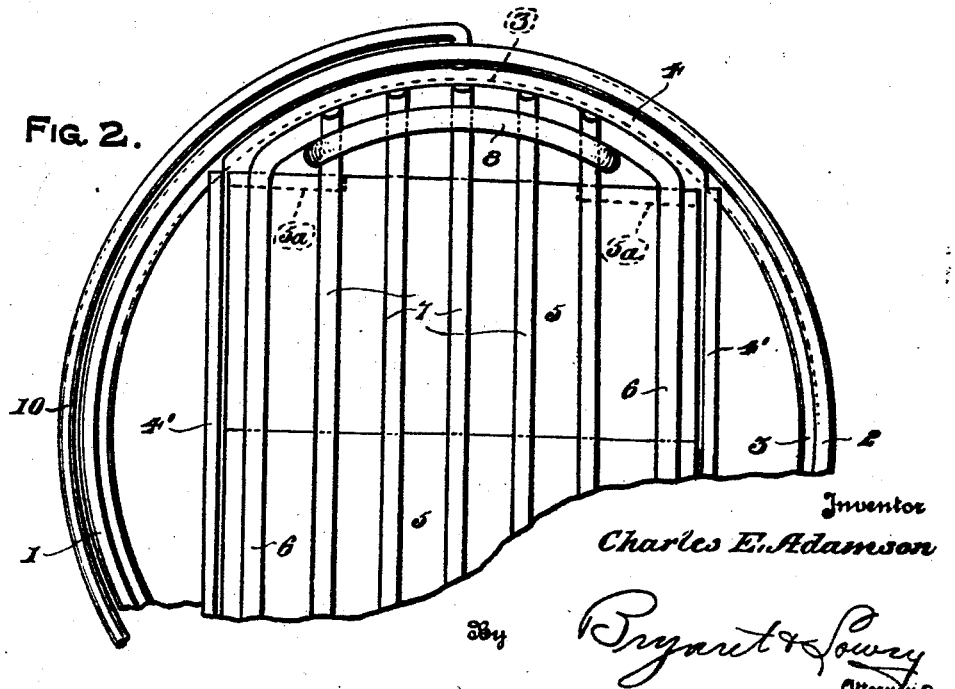
Figure 3:
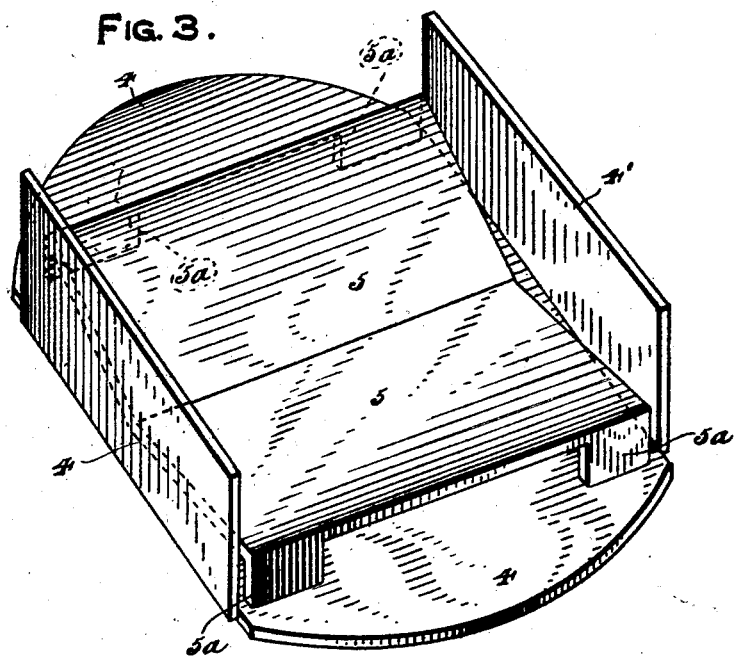
Figure 4:
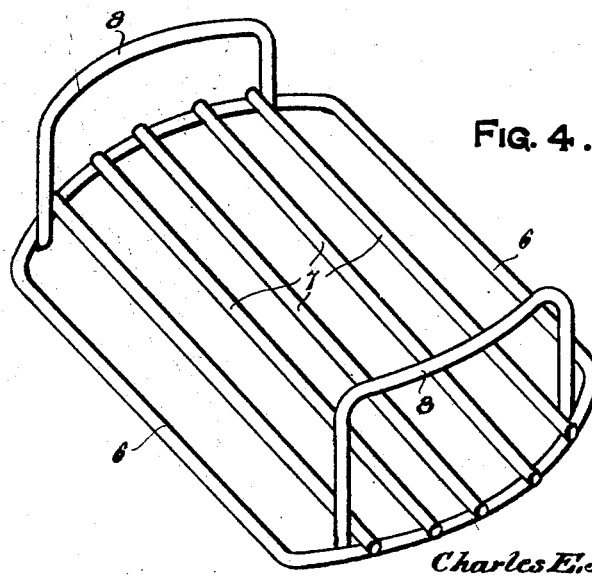

In the accompanying drawings forming a part of this specification and in which like numerals are employed to designate like parts throughout the same, Figure 1 is a side elevational view showing a part of the oven broken away, Figure 2 is a top plan view of the oven, the cover or lid being removed and a part of the body and interior of the oven being broken away, Figure 3 is a perspective view of the removable bottom portion of the oven, and Figure 4 is a perspective view of the food rack adapted to be positioned to rest upon the oven bottom shown in Fig. 3.

In the drawings, wherein for the purpose of illustration is shown a preferred embodiment of this invention, the numeral 1 designates the body portion of the oven which is preferably formed of light weight sheet steel and is of a circular or barrel shape having upper and lower edges of the metal hemmed over. An inwardly extending rib 3 is formed in the body a short distance from the bottom edge and is employed as a support for the removable oven bottom 4, shown in detail in Fig. 3. This removable bottom is of substantially circular shape, having diametrically opposed portions cutaway to form parallel edges against which the upwardly extending wings 4' are secured. These wings are arranged in parallelism in respect to each other and are employed for forming two flues or heat conducting spaces between their outer faces and the adjacent walls of the oven body 1. These flues will conduct the direct heat from a stove or burner into the interior of the oven above the removable bottom.

Resting upon this removable bottom 4 is a false bottom 5 which is formed inclined in opposite directions from its transverse center, as clearly illustrated in Fig. 3. These inclined surfaces serve to draw the radiated heat from under the false bottom upwardly into the interior of the oven. This radiated heat is discharged into the interior of the oven on diametrically opposite sides and at right angles to the direct heat flues formed by the wings 4'. At the four corners of the false bottom 5 are the perpendicular legs 5ª which support the false bottom in a rigid position upon the main bottom 4. Resting upon the false bottom 5 is a food rack, shown in detail in Fig. 4, which is formed of wire and includes an outer rim 6 of substantially elongated shape having connected thereto and extending longitudinally in respect thereof the wires 7. At the opposite ends of this food rack are the perpendicularly extending handles 8 employed for permitting the rack to be removed in a convenient manner.

A sunken cover 9 is provided for closing the top of the oven and is intended to function to prevent the draining of moisture to the outside of the oven when foods containing liquid are being cooked or baked. A wire bail 10 is also provided for the oven 1, as clearly shown in Figs. 1 and 2, and is employed to permit the oven to be conveniently carried from place to place.

The operation of this baking and cooking oven may be described as follows:—

The oven is intended to be positioned over a gas or oil burner or a cooking range and after the food to be cooked or baked is placed upon the rack and lowered into the oven with the rack resting upon the higher edges of the false bottom 5 or upon the upper edges of the wings 4', the sunken cover 9 should be positioned as illustrated in Fig. 1. The heat rising from the burner or cook range will pass into the interior of the oven body 1 through the direct heat flues formed by the perpendicular wings 4' and the adjacent faces of the wall of the body 1. The heat radiated from the bottom 4, under the false bottom 5, will be drawn or forced laterally outwardly from beneath this false bottom and will enter the interior of the bake oven at points arranged at right angles to the direct heat flues.

The food rack was described as being arranged either on the higher edges of the false bottom 5 or on the upper edges of the perpendicular wings 4'. It will be noted that the two different positions in which the food rack may be arranged will permit the food carried thereby to be held in two different positions or elevations in respect to the removable oven bottom 4. The position in which this food rack will be placed will, of course, be governed by the type of cooking or baking to be performed and the amount of heat desired.

It is to be understood that the form of this invention herewith shown and described is to be taken as a preferred example of the same, and that various changes in the shape, size, and arrangement of parts may be resorted to without departing from the spirit of the invention or the scope of the subjoined claims.

Having thus described the invention, I claim:—

1. In a device of the type decribed, an oven body open at its bottom and top, a plate removably supported in said oven body and partially closing the bore of the same, means carried by the plate and cooperating with the walls of the oven body to form heat flues at the unclosed parts of the bore of said body, a radiated heat deflector positioned on said plate to direct said heat toward the walls of the oven body, a cover for closing the top of said body, and a food rack adapted to rest upon the said deflector or the flue forming means.

2. In a device of the type described, an oven body having a removable bottom, direct heat flues extending perpendicularly through the bottom at diametrically opposite sides and having upper edges terminating above the plane of said bottom, a deflector member positioned on the bottom of said oven body to direct the heat radiated from the bottom toward diametrically opposite sides of the oven and between the direct heat flues, and a food rack in said oven body and adapted to rest either on the deflector member or the upper edges of the direct heat flues.

3. In a device of the type described, a tubular oven body, a bottom removably supported in the body and having diametrically opposed portions of its edge spaced from the wall of the body to form direct heat passing openings, and perpendicular wings carried by the bottom and extending along the edges of the said direct heat passing openings for forming, with the wall of the body, flues to conduct and discharge said heat upwardly above the plane of the bottom.

4. In a device of the type described, a tubular oven body, a bottom removably supported in the body and having diametrically opposed portions of its edge spaced from the wall of the body to form direct heat passing openings, perpendicular wings carried by the bottom and extending along the edges of the said direct heat passing openings for forming, with the wall of the body, flues to conduct and discharge said heat upwardly above the plane of the bottom, a false bottom having a width substantially equal to the distance between the perpendicular wings, and legs carried by the false bottom for supporting the latter upon the removable bottom, between said wings, and in spaced relation to the removable bottom for forming a space into which the heat radiated from the removable bottom will rise and from which it will be discharged into the oven body between the direct heating flues.

In testimony whereof I affix my signature.

CHARLES E. ADAMSON.